United States Patent Office 2,796,899
Patented June 25, 1957

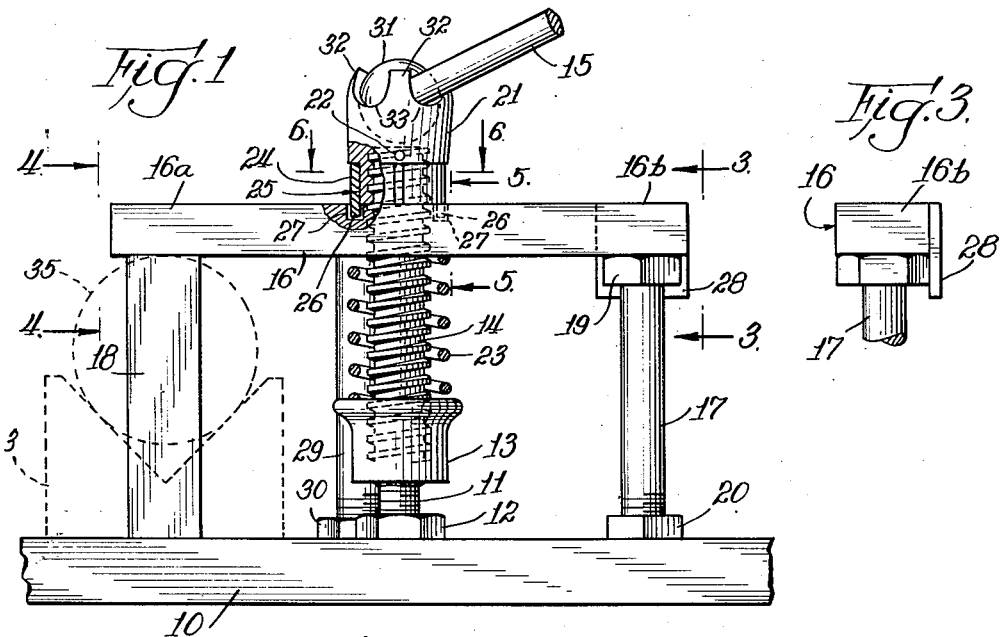
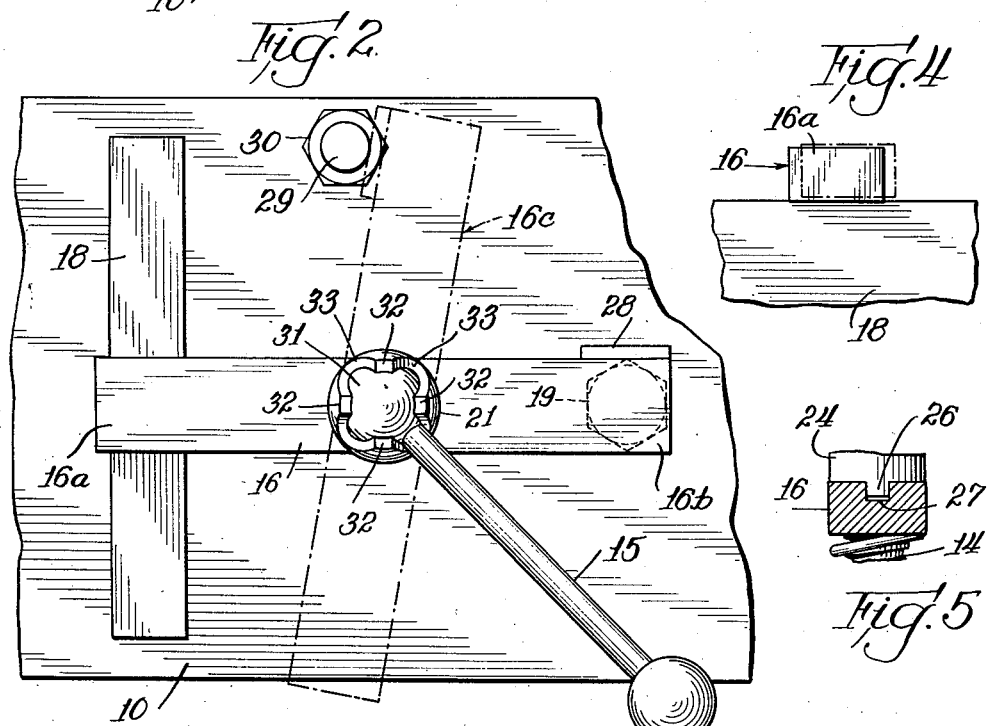
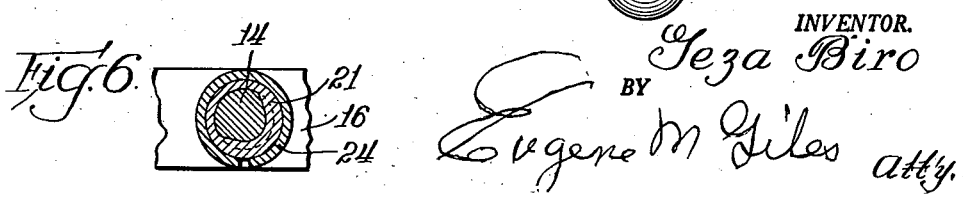

2,796,899
HOLD DOWN CLAMP
Geza Biro, Peoria Heights, Ill.

Application June 7, 1954, Serial No. 434,780

3 Claims. (Cl. 144—290)

This invention relates to a clamp for holding a piece of work in position for performing an operation thereon, as for example drilling, machining or the like, and has reference more particularly to a clamp having a holding part which not only is operable to clamp and release the work but in the clamping and releasing operations is automatically moved to and from the work holding location. The invention also includes a permanently attached operating handle which functions somewhat as a wrench and is readily orientable to any one of a number of available positions in which it is most conveniently operable.

In performing operations on or in connection with parts, especially with machine tools and the like, it is oftentimes desirable to clamp the work piece in a fixed position, and in order to place the work piece in position and remove it quickly and conveniently it is necessary that the clamping member be moved away from its clamping position so that it does not interfere with free application of the work piece in the clamping position and removal thereof.

Moreover, it is also important, particularly in production work, that no separate or independent operation be required to move the clamping member to and from the clamping position at the required time which would delay the repetitive placing of successive work pieces in place and removal thereof, and it is the principal object of this invention to eliminate any such inconvenience and delay and to accomplish the movement of the clamping member to and from the clamping position automatically and at the proper time by the same operation by which the clamping and release of the work piece is effected.

Other objects of the invention are to provide a clamping device of this type which is simple and convenient and suppliable at a low cost and which is applicable to various machines and to substantially any work piece; to insure positive movement of the clamping member entirely away from the clamping position and to a predetermined retracted position and positive return thereof to the exact position required for clamping; and to provide a novel and convenient attachment of the operating handle whereby the latter may be readily adjusted to the most convenient position for manipulation thereof; all of the foregoing objects being accomplished as more particularly pointed out hereinafter and as shown in the accompanying drawing in which:

Fig. 1 is a side view of a clamping device made in accordance with this invention, parts thereof being broken away and shown in section to disclose details of the construction;

Fig. 2 is a top view of the device with the retracted position of the clamping member indicated in broken lines;

Fig. 3 is a detail view of the rear end of the clamping member when in the clamping position and taken on the line 3—3 of Fig. 1;

Fig. 4 is a front end view, on the line 4—4 of Fig. 1, of the clamping member in the clamping position on a work piece and showing in broken lines that end of the clamping member as it starts its movement away from the clamping position;

Fig. 5 is a sectional view on the line 5—5 of Fig. 1; and

Fig. 6 is a sectional view on the line 6—6 of Fig. 1.

For purposes of illustration I have shown the clamping device with a base plate 10 which may be clamped or otherwise secured on a work bench to hold work pieces for hand operation thereon or the like, or it may be clamped or secured onto the bed plate of a machine, such, for example, as a drill press for drilling the work piece or performing any other operation performable by the drill press, or the plate 10 may be the bed plate itself of the drill press or the supporting plate of any other machine which is to perform an operation on the work piece held by the clamp.

A threaded stem 11 is fixed in an upright position on the plate 10, as for example by engagement in a threaded opening in the plate 10 and locked therein by a clamp nut 12, and this stem 11 has a socket 13 fixed on the upper end and internally threaded to receive the lower end of the clamping screw 14 which is rotatable by the handle 15.

This clamping screw 14 extends loosely through a plain central opening in a clamping bar 16, the forward end 16ª of which is the clamping part thereof and the rear end 16ᵇ of which rests on the upper end of a post 17 in the clamping operation and, of course, is located at the side of the screw 14 directly opposite the place where the work piece, indicated at 18, is to be clamped on the plate 10.

This post 17 is preferably a bolt with a head 19 at the upper end to provide a relatively wide bearing face for engagement by the bar 16, and has the lower threaded end engaged in a threaded opening in the plate 10 and clamped in position by the clamping nut 20.

Above the clamping bar 16 a head 21 is secured on the end of the screw 14 in any convenient manner, for example by a pin 22, so that the head 21 and screw 14 turn in unison and the lower end of the head bears against the top of the bar 16, the latter being held in tight frictional engagement against the lower end of the head 21 by a coil spring 23 which surrounds the screw 14 and is compressed between the socket 13 and the clamping bar 16.

Thus the screw 14 is turnable in the opening of the bar 16 through which it extends but the bar 16 is highly constrained to turn therewith by reason of the frictional engagement thereof with the lower end of the head 21 which is occasioned by the tension of the spring 23.

Moreover, this tendency of the bar 16 to turn with the screw 14 is accentuated by the provision of a split cylindrical ring 24 which is located in an annular recess 25 around the lower end of the head 21 and compressively fits thereon and has a pair of diametrically opposed depending lugs 26 which engage in corresponding diametrically opposed recesses 27 of the bar 16.

Obviously, if desired, the split ring 24 may be relied upon entirely to impart the tendency of the bar 16 to turn with the screw 14 by shortening the head 21 sufficiently so that it does not bear against the bar 16 in which event the tension of the spring 23 will clamps the upper edge of the split ring 24 frictionally against the top annular shoulder of the annular recess 25.

The screw 14 and post 17 will be arranged of appropriate length for the particular work piece 18 to be clamped thereby, and adjustment thereof may be afforded for this purpose by adjusting the threaded stem 11 and bolt 17 in the respective threaded openings of the plate 10, so that the bar 16 is substantially parallel with the top of the plate 10 in the clamping position.

In this clamping position the rear end 16ᵇ of the bar rests on the top of the post 17 as above explained, and in order to hold the bar 16 against turning movement with the screw 14 when the latter is operated in the clamping direction or clockwise, as viewed in Fig. 2, a stop extension 28 is provided at the proper side of the bar end 16ᵇ to engage against the side of the bolt head 19.

Thus as the screw 14 is then turned in the clamping direction the bar 16 is held against turning therewith by the extension or stop 28 and the sole effect then of the clamping rotation of the screw 14 is to clamp the bar 16 down at the one end onto the post 17 and at the other end onto the work piece 18 which is thereby clamped and held in place.

After this clamping operation, however, when the screw 14 is operated in the counterclockwise direction as viewed in Fig. 2, to release the clamping engagement, the rear end 16ᵇ of the bar is free to move laterally away from the top of the post 17 as soon as the clamping pressure on the work piece and the post 17 is sufficiently relieved, and immediately thereupon, the frictional engagement of the split ring 24 with the screw head 21 and the frictional engagement caused by the screw 14 compels the bar 16 to rotate with the screw away from the clamping position.

Preferably the bar 16 is moved in this operation to a position at right angles or nearly at right angles to its position in the clamping operation, so as to be far away from the location of the work piece and leave the latter entirely free and unobstructed, and to stop the movement of the bar 16, in the releasing movement of the screw at the proper place, the plate 10 is provided with another post 29 at the proper place and with the upper end thereof in the path of movement of the stop extension 28 to be engaged by the latter and prevent further turning of the bar with the screw when the bar reaches the desired retracted position which is shown by the broken lines at 16ᶜ in Fig. 2.

The post 29, like the post 17, is secured to the plate 10 by engaging the lower threaded end thereof in a threaded opening at the proper place in the plate 10 and is secured in place by a clamp nut 30. Preferably, however, the post 29 does not have a head at the upper end.

Thus when the clamping device is arranged or adjusted to the particular elevation for the work piece to be clamped thereby, and assuming that the clamping bar 16 is in the retracted position shown in dotted lines 16ᶜ, the turning of the screw 14 by the handle in the clamping direction, namely in the clockwise direction as viewed in Fig. 2—by reason of the frictional effect of the split ring 24 on the head 21 and the keyed connection thereof by the lugs 26 to the bar 16, and also the frictional engagement of the bar against the head 21 by reason of the spring 23—immediately turns the clamping bar 16 to the clamping position shown in full lines at 16 in Fig. 2 before there is any appreciable clamping movement of the bar 16.

When, however, the bar reaches this clamping position which is determined by the engagement of the stop extension 28 with the head 19 of the post 17, then the continued turning movement of the screw 14 merely forces the bar 16 toward the plate 10 which supports the work piece 18 and as the rear end 16ᵇ of the bar then bears against the fixed upper end of the post 17, the forward end 16ᵃ thereof is caused to bear against the top of the work piece 18 at an increasing pressure until sufficient holding pressure is attained whereupon the turning of the handle 15 in the aforesaid clockwise direction is discontinued and the intended work to be performed on the work piece is thereupon performed.

When the work is completed, the screw 14 is operated in the reverse direction, namely in the direction opposite to that of its clamping operation, or counterclockwise as viewed in Fig. 2, and the initial effect thereof is to release the clamping pressure on the work piece 18. As soon, however, as this clamping pressure is released sufficiently to permit the end 16ᵃ of the bar to swing away from the work piece, then the constantly exerted frictional effect above mentioned immediately causes the bar 16 to turn with the screw 14 until the bar reaches the position indicated by the dotted lines 16ᶜ whereupon it is stopped by the post 29, whereupon further turning of the screw 14 in that direction then merely lifts the bar 16 to a higher elevation.

From the foregoing it will be understood that the turning movement of the bar 16 to and from the clamping position is automatically accomplished at the appropriate times merely by the normal clamping operation of the screw 14 and requires no attention or a special procedure by the operator and interposes no delay in the accomplishment of the work to be performed. Moreover, it assures adequate removal, in each interval between operations or successive pieces of work, of the clamping member from the place where the work is to be applied and removed so that there is complete freedom of application and removal and no interference therewith.

Preferably the handle 15 is attached to the head 21 and arranged so that it may be conveniently oriented around the head so that it may be positioned at the particular place where it may be most readily manipulated, and it is an important feature that the handle 15 is provided at its inner end with a ball 31 which engages in a socket at the upper end of the head 21, being retained therein by a series of peripheral claws 32 which are spaced apart peripherally to provide notches 33 to accommodate the stem portion of the handle therein and which are deep enough so that when the stem of the handle is therein it is positively interlocked with the head 21 so that the handle and the head and also the screw 14 turn in unison.

Thus the handle may be readily changed from one to another interlocked position with the head by merely raising the outer end of the handle sufficiently to clear the particular notch 33 in which it is engaged and moving it to and engaging it with another selected notch 33.

I have shown herein for purposes of illustration, merely a simple work piece which rests upon the plate 10 and is clamped thereagainst but it is to be understood that this is merely illustrative and the clamp is intended for clamping work pieces or other objects of various types and shapes and they may be clamped in jigs or holders appropriate therefor as is well known in the art. As an instance thereof I have shown in dotted lines in Fig. 1 a conventional V-block 34 which rests on the plate to receive a work piece 35 of round bar stock or having a round portion thereof which is accommodated in the V-block, and it is to be understood that this V-block or whatever holder is employed may be secured to the plate 10 in a fixed position so that it centers or locates the work in the exact position necessary for the work to be properly performed thereon.

While I have shown and described my invention in a preferred form, I am aware that various changes and modifications may be made therein without departing from the spirit of the invention, the scope of which is to be determined by the appended claims.

What is claimed is:

1. An adjustable clamp of the class described which comprises a work support and a clamping bar which is cooperable with the work support to clamp a work piece therebetween, the clamping bar being spaced laterally from the work support and connected at a place substantially midway between its ends to the work support by a threaded connection which has at the side of the clamping bar remote from the work support an operating member which is rotatable about an axis substantially perpendicular to the clamping bar to adjust said bar toward and away from the work support and the clamping bar being frictionally engaged with said operating member to swing therewith about said axis to and from a position in which one end of the clamping bar is located opposite a predeterimned place on the work support where a work piece is adapted to be clamped between said end of the clamping bar and the work support, the said operating member being independently rotatable against the frictional resistance of the aforesaid frictional engagement when the said clamping bar is held against the aforesaid swinging movement therewith, the said clamping bar and work support having a spring compressed therebetween at the place of said threaded connection and against the tension of such compression of which the clamping bar is adjustable toward the work support by the aforesaid rotation of said operating member, one of the said frictionally engaged parts having a barrel portion frictionally confined within a circumferential member which is connected to and positively rotatable about said axis with the other of said frictionally engaged parts.

2. An adjustable clamp of the class described which comprises a work support and a clamping bar which is cooperable with the work support to clamp a work piece therebetween, the clamping bar being spaced laterally from the work support and connected at a place substantially midway between its ends to the work support by a threaded connection which has at the side of the clamping bar remote from the work support an operating member which is rotatable about an axis substantially perpendicular to the clamping bar to adjust said bar toward and away from the work support and the clamping bar being frictionally engaged with said operating member to swing therewith about said axis to and from a position in which one end of the clamping bar is located opposite a predetermined place on the work support where a work piece is adapted to be clamped between said end of the clamping bar and the work support, the said operating member being independently rotatable against the frictional resistance of the aforesaid frictional engagement when the said clamping bar is held against the aforesaid swinging movement therewith, the said clamping bar and work support having a spring compressed therebetween at the place of said threaded connection and against the tension of such compression of which the clamping bar is adjustable toward the work support by the aforesaid rotation of said operating member, one of the said frictionally engaged parts being frictionally confined within a circumferential member which has an extension engaged in a recess of the other of said frictionally engaged parts in a manner to cause positive rotation of said circumferential member with the last mentioned frictionally engaged part.

3. An adjustable clamp of the class described which comprises a work support and a clamping bar which is cooperable with the work support to clamp a work piece therebetween, the clamping bar being spaced laterally from the work support and connected at a place substantially midway between its ends to the work support by a threaded connection which has at the side of the clamping bar remote from the work support an operating member which is rotatable about an axis substantially perpendicular to the clamping bar to adjust said bar toward and away from the work support and the clamping bar being frictionally engaged with said operating member to swing therewith about said axis to and from a position in which one end of the clamping bar is located opposite a predetermined place on the work support where a work piece is adapted to be clamped between said end of the clamping bar and the work support, the said operating member being independently rotatable against the frictional resistance of the aforesaid frictional engagement when the said clamping bar is held against the aforesaid swinging movement therewith, the said clamping bar and work support having a spring compressed therebetween at the place of said threaded connection and against the tension of such compression of which the clamping bar is adjustable toward the work support by the aforesaid rotation of said operating member, one of the said frictionally engaged parts being confined within a circumferentially contractible member which is connected to the other of said frictionally engaged parts to rotate positively therewith around said axis.

References Cited in the file of this patent

UNITED STATES PATENTS

| | | |
|---|---|---|
| 1,072,363 | Roberts | Sept. 2, 1913 |
| 1,209,658 | Baltzley | Dec. 26, 1916 |
| 1,758,733 | Cayo | May 13, 1930 |
| 2,236,439 | McKenna | Mar. 25, 1941 |
| 2,421,957 | Mead | June 10, 1947 |
| 2,524,507 | Anthony | Oct. 3, 1950 |
| 2,650,523 | Zwick | Sept. 1, 1953 |
| 2,727,544 | MacArthur | Dec. 20, 1955 |